(12) United States Patent
Brien

(10) Patent No.: US 6,568,092 B1
(45) Date of Patent: May 27, 2003

(54) ANGLE COSINE INDICATOR

(76) Inventor: Ward William Brien, Devenshire, Chatsworth, CA (US) 91311

( * ) Notice: Subject to any disclaimer, the term of this patent is extended or adjusted under 35 U.S.C. 154(b) by 0 days.

(21) Appl. No.: 09/699,097

(22) Filed: Oct. 30, 2000

Related U.S. Application Data

(60) Provisional application No. 60/150,605, filed on Aug. 26, 1999.

(51) Int. Cl.[7] .............................. F41G 1/00; G01C 1/00
(52) U.S. Cl. ...................... 33/1 PT; 33/10 SB; 33/265; 33/284; 33/399
(58) Field of Search .............................. 33/1 SB, 1 SA, 33/1 SD, 227, 228, 265, 276–278, 282–284, 391, 399, 401; 42/122, 130, 135, 142

(56) References Cited

U.S. PATENT DOCUMENTS

| | | | | |
|---|---|---|---|---|
| 2,754,594 A | * | 7/1956 | Harms et al. | 33/1 SD |
| 2,988,952 A | * | 6/1961 | Hopkins | 33/1 SD |
| 3,000,100 A | * | 9/1961 | Reinhardt | 33/1 SD |
| 3,427,724 A | * | 2/1969 | Tracy | 33/1 SD |
| 3,675,332 A | * | 7/1972 | Miller et al. | 33/1 SA |
| 3,814,903 A | * | 6/1974 | Jankowiak | 33/1 SD |
| 3,925,899 A | * | 12/1975 | Hesse et al. | 33/1 SD |
| 6,240,647 B1 | * | 6/2001 | Moustgaard et al. | 33/1 SD |

* cited by examiner

*Primary Examiner*—Diego Gutierrez
*Assistant Examiner*—Yaritza Guadalupe
(74) *Attorney, Agent, or Firm*—Kelly Bauersfeld Lowry & Kelley, LLP

(57) ABSTRACT

The invention relates to a targeting device comprising a casing which houses a wheel. The wheel is weighted and free to rotate relative to the casing. A mount on the casing mates with a receiving apparatus on the rifle, thereby securing the casing to the rifle. The wheel's absolute orientation remains fixed, while the casing rotates with the rifle as it is aimed upward or downward. The casing has a window through which the wheel is visible. For any angle at which the rifle is positioned, a marker inscribed on the wheel aligns with a cosine number inscribed on the window, indicating the cosine of the angle at which the rifle is positioned. The cosine numbers are readable without requiring the shooter to break his cheek weld with the rifle. The shooter can then calculate the horizontal distance to target by multiplying the cosine by the straight-line distance to target.

17 Claims, 3 Drawing Sheets

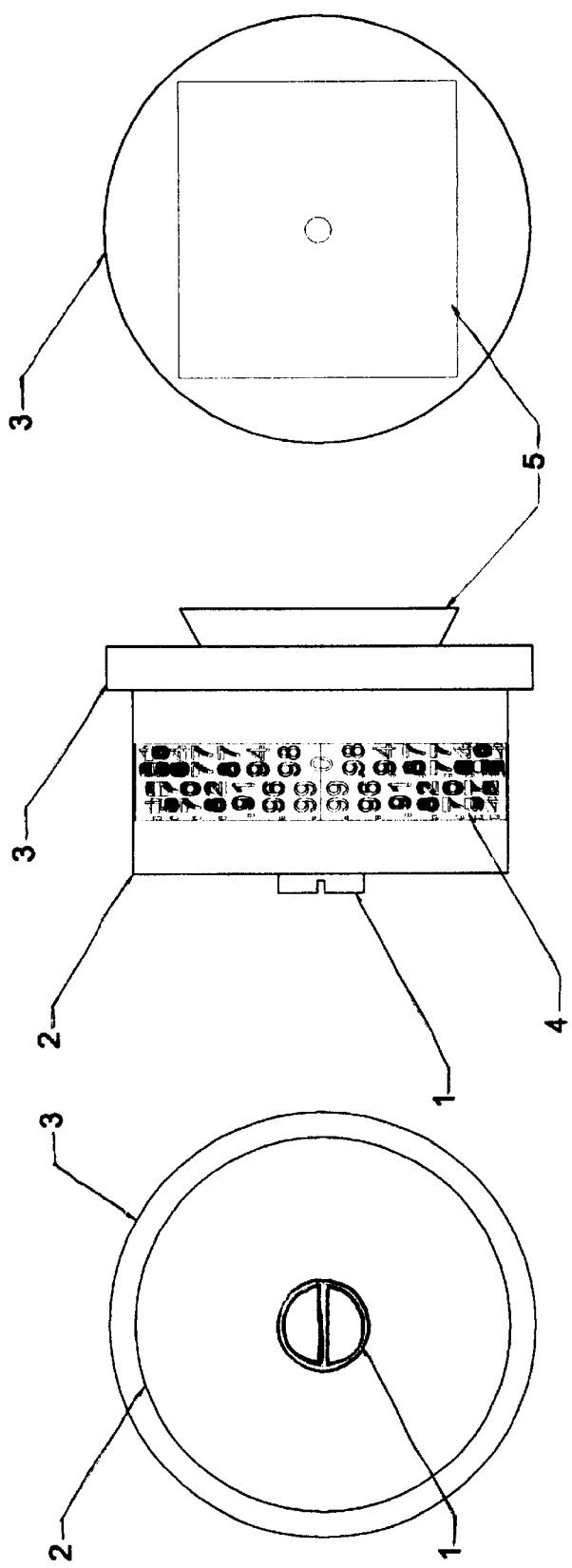

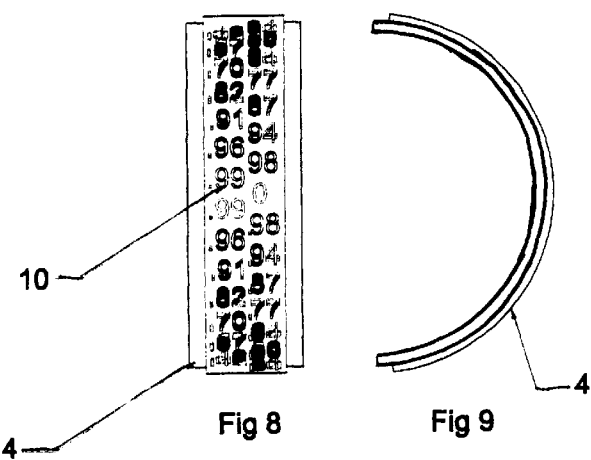
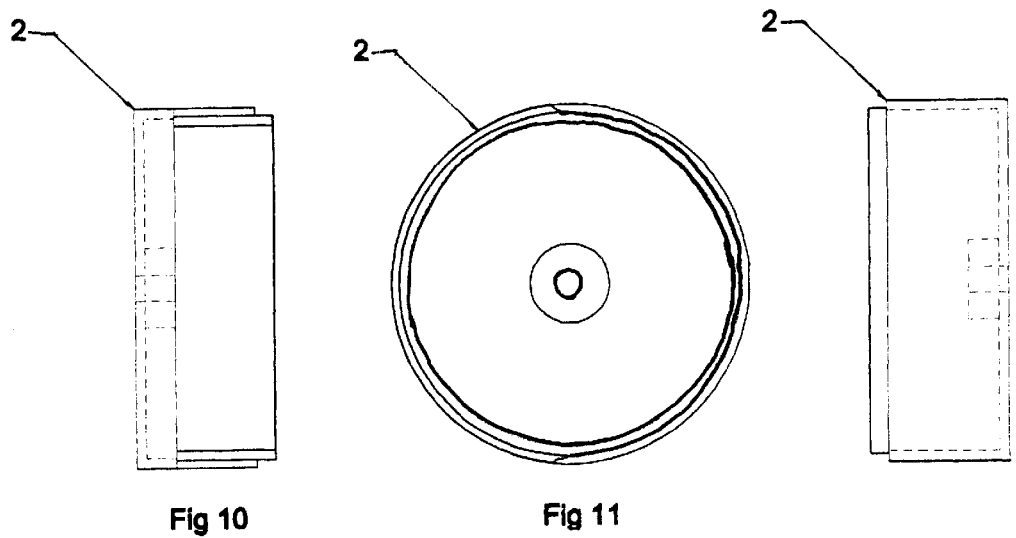
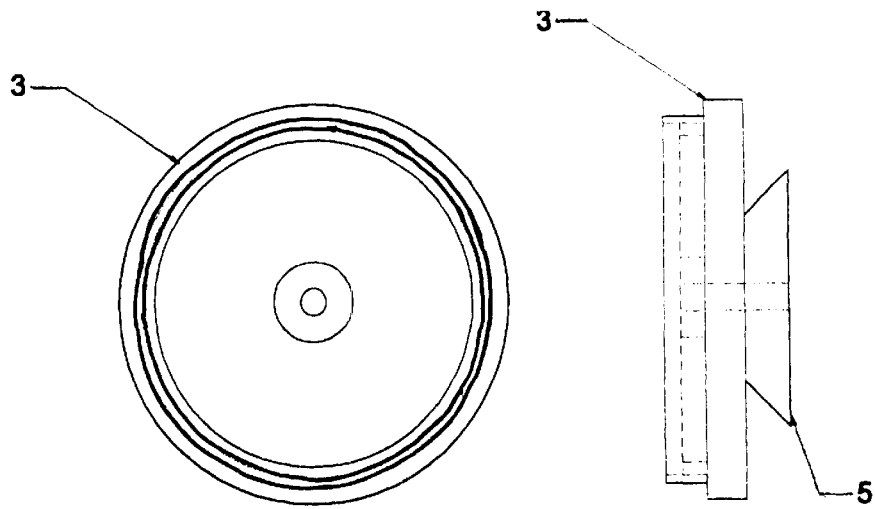

ANGLE COSINE INDICATOR

This application claims Benefit of Provisional application Ser. No. 60/150,605 filed Aug. 26, 1999.

BACKGROUND OF THE INVENTION

Gravity exerts an earth-bound force on a fired projectile, causing the projectile to depart from its line of fire and strike lower than aimed. Therfore, when a shooter aims at a target, the effect of gravity must be overcome by aiming higher than the actual target. The total effect of gravity in pulling a projectile out of its line of fire is a function of the horizontal, not straight-line, distance from shooter to target. In other words, the farther away horizontally the target, the higher the shooter must aim above the target to compensate for gravity. Most rifles allow the shooter to "zero" the sights based on the distance to target the shooter knows the straight-line distance to the target, and sets the sights according to that distance, which results in aiming above the target, thereby compensating for gravity.

This system works well when the shooter and target are at the same elevation because the horizontal distance and the straight-line distance are the same. Therefore, even though a shooter should set his rifle sights according to the horizontal distance to target, and not the straight-line distance, when those two distances are equal, knowing one is as good as knowing the other. However, if the shooter is required to aim upward or downward to engage his target, setting the sights according to the straight-line distance to target will result in the projectile striking too high. The shooter must calculate the horizontal distance to target to compensate for gravity's effect. Traditionally, a shooter would measure the vertical angle between himself and his target by means of a protractor, calculate the cosine of the angle, multiply the straight-line distance by the cosine to get the horizontal distance, and set his sights according to that distance. This method is time-consuming and requires the shooter to make an accurate trigonometric calculation before firing. This is especially problematic when time is of the essence in sighting, engaging, and firing at the target.

BRIEF SUMMARY OF THE INVENTION

It Is an object of the present invention to provide a small, lightweight device providing a faster, more reliable method for correcting for the gravitational effect when shooter and target are at different elevations. This is accomplished by allowing the shooter to read the cosine of the angle directly without breaking his cheek weld with the rifle, thereby removing the need to make a trigonometric calculation.

The present invention's casing attaches directly to the rifle or scope by means of a mounting apparatus that is part of the casing, and remains fixed with the rifle so that it rotates as the rifle rotates. The casing houses an inner wheel upon which a marker is inscribed. The wheel is free to rotate independently of the casing and a stabilizer comprised of a weight keeps the wheel fixed relative to horizontal, while the casing rotates with the gun as the shooter aims up or down.

A window on the casing allows viewing of the inner wheel, and has indicia comprised of cosine numbers inscribed on it. As the shooter aims the rifle up or down, the cosine numbers rotate relative to the marker on the inner wheel, and the cosine number aligning directly over the marker represents the cosine of the angle at which the rifle is currently positioned. The shooter can then multiply the straight-line distance to target by the cosine number. This gives the horizontal distance to target, which is the number required for adjusting the rifle's sights before firing.

BRIEF DESCRIPTION OF THE DRAWINGS

FIG. 1 is a side elevational view of a targeting device embodying the present invention;

FIG. 2 is a top plan view of the targeting device of the present invention;

FIG. 3 is a side view of the targeting device generally opposite that of FIG. 1;

FIG. 8 is a top plan view of a lens having cosine numbers inscribed thereon in accordance with the present invention;

FIG. 9 is a side view of the lens of FIG. 8;

FIG. 10 is an end view of a casing member used in accordance with the present invention;

FIG. 11 is a side and end view of the casing of FIG. 10;

FIG. 12 is cross-sectional view of a casing used in accordance with the present invention; and FIG. 13 is a mount used in accordance with the present invention.

DETAILED DESCRIPTION OF THE PREFERRED EMBODIMENT

The present Invention resides in a targeting device for assisting the determination of the distance to the target, and the adjusting of the rifle sites and angle before firing.

Figure 7:
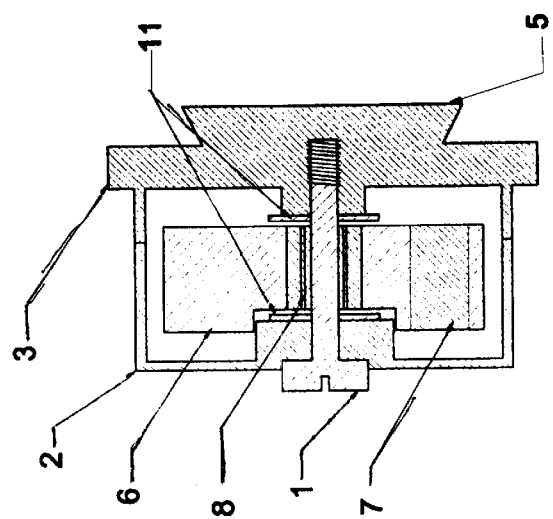
FIG. 7 is a cross-sectional view of the assembled targeting device.
Figure 6:
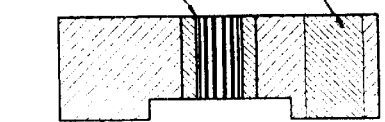
FIG. 6 is a cross-sectional view of the wheel.
Figure 5:
FIG. 5 is a top plan view of the wheel, illustrating a marker thereon.
Figure 4:
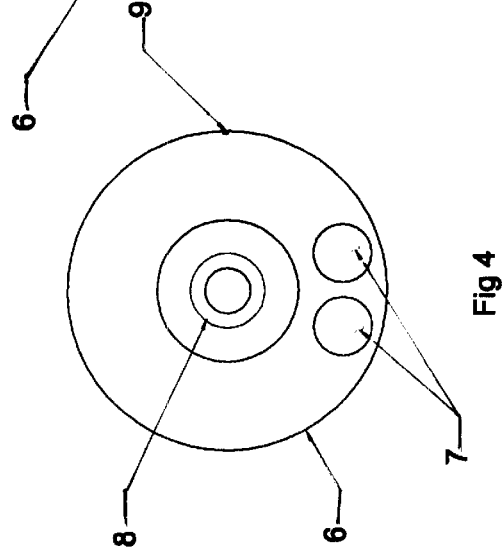
FIG. 4 is a side elevational view of a wheel of the targeting device having weights therein.

With reference now to FIGS. 1–13, the targeting device is comprised of opposing casing members 2 and 3 housing a wheel 6 which is supported for rotational movement within the casing 2 and 3 by an axle 1. The axle binds the two halves of the casing 2 and 3 together, while allowing the whee to freely rotate. The axle 1 is typically comprised of a screw or bolt which penetrates the casing sections 2 and 3 through central openings formed therein.

The axle 1 serves as a means of securing the wheel 6 within the casing. A needle bearing 8 fits over the axle 1, and the wheel 6 fits over the needle bearing, thereby allowing the wheel to rotate independently of the axle 1. Two washers 11 are disposed on each side of the wheel 6 and bearing assembly. The wheel 6 has a weight 7 associated therewith, which keeps the wheels' orientation relative to the earth fix because of gravity. The weight 7 thus serves as a stabilizer, and the wheel 6 rotates until the stabilizing weight 7 is at the lowest point of gravity. The weight may be embedded in the wheel 6, as illustrated, or otherwise attached to the wheel to maintain an absolute orientation of the wheel relative to gravity.

A window In the casing 2 and 3, of approximately 160°, houses a transparent lense 4. The lense 4 preferably includes cosine numbers 10 inscribed thereon. A marker 9 is inscribed on the surface of the wheel 6, such that as the wheel 6 rotates, the marker 9 aligns itself with a cosine number 10 on the lense 4. This indicates the angle of the rifle from horizontal and permits corrected target distance to be determined. It will be appreciated by those skilled in the art that the cosine numbers 10 can be inscribed on the outer surface of the wheel 6, and the marker 9 inscribed on the lense 4 to achieve the same result. What is important to the invention is that the cosine of the angle of rifle from horizontal be indicated, permitting corrected target distance to be determined.

Preferably, a mount 5 is attached to the casing to allow the targeting device to be mated With the receiving apparatus on a rifle or scope in order to secure the device to the rifle or scope so that it is readily accessible to view the indicated cosigned value at the given rifle angle.

Thus, as the casing rotates with the rifle as it is aimed upward or downward, the wheels absolute orientation remains fixed. This is due to the fact that the wheel is free to rotate about the axle. For any angle in wlich the rifle is positioned, a marker inscribed on the wheel or lense aligns with a cosign number inscribed on the window or wheel. This cosign number is readable without requiring the shooter to break his cheek weld with the rifle, enabling the shooter to calculate the horizontal distance to the target by multiplying the cosign by a straight-line distance to the target.

Although several embodiments of the present Invention have been described in detail for purposes of illustration, various modifications of each may be made without departing from the spirit and scope of the invent on. Accordingly, the invention is not to be limited, except as by the appended claims.

What is claimed is:

1. A targeting device, comprising:
   a casing having a window and attachable to a rifle or scope;
   an inner wheel rotatably disposed within the casing and viewable through the window;
   a stabilizer attached to the wheel for maintaining an absolute orientation of the wheel while the casing is rotated;
   indicia and a marker attached to the wheel or casing, whereby for any angle at which the rifle is positioned, the marker aligns with specific indicia, indicating departure of the rifle's position from horizontal and permitting corrected target distance to be determined.

2. The device of claim 1, wherein the window is disposed along the circumferential edge of the casing permitting viewing of the inner wheel from a vantage point on an axis normal to an axis about which the casing rotates.

3. The device of claim 1, wherein the casing includes a mount, mateable with a receiver on the rifle or scope.

4. The device of claim 1, wherein the stabilizer comprises a weight attached to the wheel.

5. The device of claim 1, wherein the indicia are cosine values corresponding to angles of the rifle from horizontal.

6. The device of claim 1, wherein the indicia are angle values of the rifle from horizontal.

7. The device of claim 1, wherein the window is a transparent section of the outer casing and the indicia is inscribed thereon, and wherein the marker is imprinted onto an outer surface of the wheel, whereby for any angle at which the rifle is positioned, the marker on the wheel aligns with specific indicia on the window.

8. The device of claim 1, wherein the indicia is inscribed upon the wheel and the marker is inscribed upon the casing, whereby for any angle at which the rifle is positioned, the marker on the casing aligns with specific indicia on the wheel.

9. The device of claim 1, wherein the stabilizer is embedded in the wheel.

10. A targeting device, comprising:
    a casing, attachable to a rifle or scope;
    a window comprised of a transparent section of the casing;
    an inner wheel rotatably disposed within the casing and viewable through the window;
    a stabilizer comprised of a weight attached to the wheel for maintaining an absolute orientation of the wheel while the casing is rotated;
    indicia comprised of cosine values inscribed on the window;
    a marker inscribed on the wheel, whereby for any angle at which the rifle is positioned, the marker aligns with specific indicia, indicating the cosine of the angle of the rifle from horizontal and permitting corrected target distance to be determined.

11. The device of claim 10, wherein the window is disposed along the circumferential edge of the casing permitting viewing of the inner wheel from a vantage point on an axis normal to an axis about which the casing rotates.

12. The device of claim 10, wherein the casing includes a mount, mateable with a receiver on the rifle or scope.

13. The device of claim 10, wherein the stabilizer is embedded in the wheel.

14. A targeting device, comprising:
    a casing, attachable to a rifle or scope;
    a window comprised of a transparent section of the casing;
    an inner wheel rotatably disposed within the casing and viewable through the window;
    a stabilizer comprised of a weight attached to the wheel for maintaining an absolute orientation of the wheel while the casing is rotated;
    indicia comprised of angle values inscribed on the window;
    a marker inscribed on the wheel, whereby for any angle at which the rifle is positioned, the marker aligns with specific indicia, indicating the angle of the rifle from horizontal and permitting the corrected target distance to be determined.

15. The device of claim 14, wherein the window is disposed along the circumferential edge of the casing permitting viewing of the inner wheel from a vantage point on an axis normal to an axis about which the casing rotates.

16. The device of claim 14, wherein the casing includes a mount, mateable with a receiver on the rifle or scope.

17. The device of claim 14, wherein the stabilizer is embedded in the wheel.

* * * * *